Aug. 5, 1969

J. V. BASS

3,460,123

CLOTHING ALARM MEANS

Filed July 14, 1965

JACK V. BASS INVENTOR.

BY John Cyril Malloy

United States Patent Office 3,460,123
Patented Aug. 5, 1969

3,460,123
CLOTHING ALARM MEANS
Jack V. Bass, 2335 Trapp Ave., Miami, Fla. 33133
Filed July 14, 1965, Ser. No. 471,886
Int. Cl. G08b 21/00
U.S. Cl. 340—235                 3 Claims

ABSTRACT OF THE DISCLOSURE

An undergarment of diaper form to signal the patient when urine is present in which includes a pair of superimposed but spaced urine detection means of screen form to be electrically bridged by the urine to permit a current to flow from a battery source to a transmitter to cause an audible signal.

---

This invention relates to an alarm means for indicating the presence of urine, and more particularly, to an alarm means having a transmitter means in an undergarment for indicating the presence of urine by producing an audible sound.

As is perhaps well known, there are various types of alarm devices for the purpose of toilet training the very young, and for aiding the ever increasing number of senior citizens who are incontinent of urine. If toilet training of children is not properly instituted, urine saturated clothing in contact with their sensitive skin for extended periods of time will cause skin problems. At this moment of scientific history, medical research has not yet provided a suitable means for helping the thousands of young adults and elderly persons who lack properly functioning sensory nerves that are necessary for correct emptying of the bladder. Not only are their physical problems insurmountable but the associated social difficulties are overwhelming and often they are deliberately avoided by society. Alarm devices provide a means for informing the individual that voiding has taken place, so that, clothing may be changed, the skin cleansed and discomfort relieved.

With particular reference to this invention, the alarm means in the preferred embodiment includes a transmitter for producing a radio signal and a signal means for actuating the transmitter. The transmitter is detachably encased in a protective housing that is secured to the upper waste portion of the undergarment, and the signal means is secured to the crotch portion of the undergarment. The signal means includes a pair of conductive screens in superimposed but spaced apart relation with a liquid-permeable, electrical insulator between them. When urine is passed from the bladder of the person wearing the undergarment, the urine flows into the crotch portion of the garment and permeates the insulating material and electrically bridges the space between the conductive screens. The trigger element, urine, will thereby actuate the transmitter to produce a radio signal for actuating a remote alarm device which indicates the presence of urine in the undergarment.

This invention is especially useful for toilet training children. The child's attendant is immediately informed when the child begins to urinate, even though the attendant is in another room of the house. This alarm means informs the attendant so that the child may be taken immediately to the toilet. In this manner, the child will learn quickly by repetition of the attendant's act and form a lifetime habit with a minimum amount of time and effort being expended.

The alarm means avoids confusing the child during toilet training. A child is usually confused when he is placed on a toilet after he has urinated, especially if there is any time lapse between his act and the time he is placed upon the toilet. Confusion often occurred in the past when an attendant placed the child on a toilet everytime the attendant discovered that the child's clothing was wet, because the clothing may have been wet for some time.

A main object of this invention is to provide a comfortable and functional alarm means including a signal means which is placed in the immediate area of the organ of urination for the express purpose of actuating the alarm and thereby informing an attendant or the individual that urination has begun, so that, the person will either gain control of his bladder through training programs, and prevent soiling of clothing, or change his clothing to maintain a sanitary environment, and thereby prevent skin ulcers, embarrassment and untidy appearance.

Another object of this invention is to produce a transmitter means including a transmitter for actuating an alarm device in combination with clothing that includes a signal means connected to the transmitter for actuating it when urine is present in the clothing. The transmitter is easily detached from the signal means, so that, the clothing soiled by urine may be washed in the normal manner. Therefore, only one transmitter is required for each person, although his condition may require many and frequent changes in clothing.

An additional object of this invention is to provide a transmitter means detachably connected to an undergarment with a pair of conductive screen in superimposed but spaced apart relation and secured to the crotch portion of the undergarment for actuating the alarm when urine electrically bridges the space between the conductive screens.

A further object is to provide such a transmitter means as set forth in the preceding paragraph, said transmitter means includes a battery powered transmitter encased in a protective housing that is secured to the upper waist portion of the undergarment for producing an audible sound in a remote receiver that is in the vicinity of the attendant, when the transmitter is actuated by the signal means.

The present invention will be more apparent by reference to the following detailed description of a preferred arrangement of the invention wherein reference will be made to the accompanying drawings in which.

Figure 1:
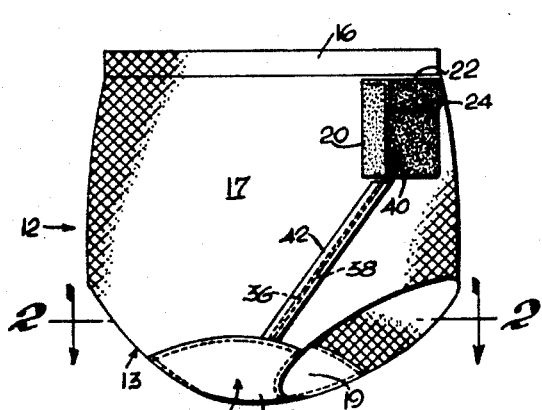
FIGURE 1 is a perspective view of the alarm means, including an undergarment, and a transmitter means connected in the housing adjacent the upper waist portion of the undergarment.

Referring to FIGURE 1 of the drawing, which shows the preferred embodiment of the alarm means, designated as numeral 12, the undergarment 13 is in the form of training pants having a pair of leg openings with a crotch portion 14 therebetween, and a trunk opening with a waist band 16 along the upper margin, preferably of an elastic material. An elastic band, not shown, may be connected around the marginal edge of each leg opening to provide a snug fit. The undergarment 13 has a main body portion with an outer layer 17 made of a plastic-like material and an optional inner layer 15 of a soft material. The crotch portion 14 has an outer layer 18 of the plastic-like material, similar to the outer layer 17 of the main portion, and an innner layer 19 of soft, liquid-permeable material superimposed over the outer layer and stitched to the outer layer along the marginal edges. The crotch portion 14 is stitched to the main portion 17 to form the leg openings in the undergarment.

The undergarment 13 has a housing 20 with a lid 22 secured to the main body portion 17 adjacent the elastic waist band 16. The housing and lid are made of a flexible material which gives protection to both the wearer of the undergarment and the transmitter means held in the housing. The housing 20 has a compartment therein with an opening at the top which is covered by the lid 22 in order to secure the transmitter means in the compartment. The lid and the housing have mating portions of a snap means 24 thereon, for detachably securing the lid over the opening. Multiple openings may be provided in either side of the housing 20, not shown, so that if the alarm device 60 is placed in the compartment the audible sound may be heard at a greater distance.

Figure 2:
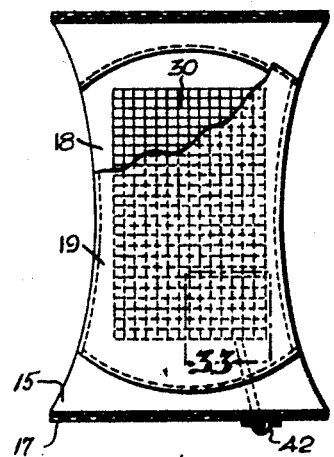
FIGURE 2 is an enlarged, cutaway, plan view of the crotch portion of the undergarment in cross section taken along the plane of the line 2—2 of FIGURE 1, and looking in the direction of the arrows.
Figure 3:
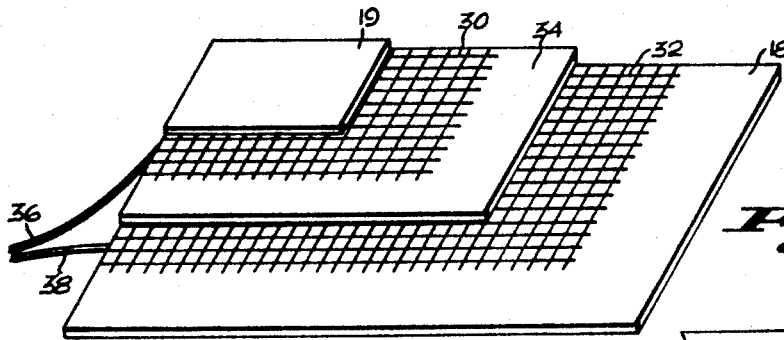
FIGURE 3 is an enlarged, perspective, cutaway view of that portion of the crotch of the undergarent of FIGURE 2 with the arrows 3—3 therearound.
Figure 4:
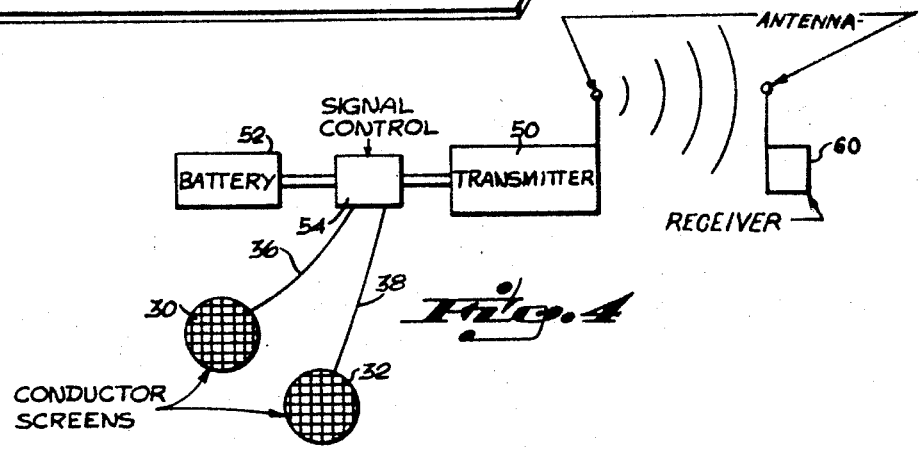
FIGURE 4 is a block diagram of the alarm system connected to the conductive screens.

The crotch portion 14 of the undergarment, as shown in FIGURE 2, has an inner layer 19 and an outer layer 18, with a pair of conductive screens 30 and 32 in superimposed but spaced apart relation with a liquid-permeable electrical insulator 34 between the screens, as shown in FIGURE 3. The screens are centrally spaced in the crotch portion of the garment so that they are in position to receive the flow of urine from the bladder. The screens have openings therein, to allow passage of urine from the bladder into the insulating material 34, so that the urine may electrically bridge the space between the conductive screens 30 and 32. Each screen has a conductive lead 36 or 38 electrically connected to it; both leads extend between the conductive screens 30 and 32 and an electrical terminal 40 in the housing. The leads are secured to the undergarment between the main body portion 17 and an insulating cover 42. The terminal 40 may be located in the lid 22, so that the conductive screens may be conveniently connected to a transmitter means having an upper terminal.

The transmitter means may produce an audibile sound directly or in the preferred embodiment. The transmitter means produces a radio signal to activate a remote receiver 60 when the trigger element, urine, electrically bridges the gap between the conductive screens. When the conductive screens 30 and 32 are bridged, a signal is transmitted to the signal control means 54, which connects the transmitter 50 to the battery 52 for producing the radio signal. The transmitter means includes the battery power source 52 connected to the signal control means 54 for actuating the transmitter 50 by any number of well known means. The signal control means 54 is connected to the screens 30 and 32 by the lead wires 36 and 38 for actuating the signal control means 54 in a normal manner.

The portable receiver 60, of any of the well known types, is activated by a radio signa from the transmitter when urine electrically bridges the space between the conductive screens 30 and 32. The receiver 60 produces an audible sound when activated.

In use, the wearer or attendant places the undergarment or bedding on or beneath the individual so that the conductive screens are in a position to receive the flow of urine from the organ of urination. The transmitter means is placed in the housing compartment and is electrically joined to the fitting at the upper end of the lead wires that are connected to the conductive screens. The lid is then secured to encase the transmitter means within the housing compartment. When urine flows into the undergarment or bedding, the alarm will sound to draw attention to the fact that a clothing change is necessary. The wearer or attendant can easily disconnect and remove the alarm device from the housing compartment, change the undergarment or bedding, and reconnect the same alarm device to the fresh undergarment or bedding. The soiled clothing, containing the conductive means, may be washed in the usual manner for reuse in the future.

The above described arrangements are illustrative of this invention. Numerous other arrangements may be devised by one skilled in the art without departing from the spirit and scope of this invention.

What is claimed is:

1. An alarm means for detecting the presence of urine comprising; a transmitter means including a power source, a transmitter for activating a remote receiver for producing an audible sound when connected to paid power source, and a signal control means connected to said power source for connecting said power source to said transmitter when activated by a signal; and an undergarment of the type covering the lower trunk of a human body with a closed crotch portion, leg openings, and a trunk opening, said undergarment including an outer layer of plastic-like material, an inner layer of soft, liquid-permeable material connected to said outer layer; a pair of conductive means secured to the crotch portion of said undergarment between said outer and said inner layers in superimposed but spaced-apart relation, each of said conductive means comprising a conductive screen having a number of openings therein sized for allowing a conductive liquid to pass therethrough, a liquid permeable, electrical insulator between said conductive means, an open-top protective housing with a compartment therein secured to said undergarment adjacent the trunk opening for receiving said transmitter means, said housing having a lid attached to one side of the opening and extending over the opening, an electrical fitting in the housing for joining with a mating fitting connected to said signal control means, and a conductive lead connected between each of said conductive means and the fitting in said housing; when the triggering element, urine, electrically bridges the space between said conductive means, a signal is transmitted to the signal control means for actuating it.

2. An undergarment for detecting the presence of a conductive liquid therein, said undergarment of the type covering the lower trunk of a human body with a crotch portion comprising; a pair of conductive means secured to the crotch portion of said undergarment in spaced apart relation with a liquid-permeable insulator therebetween, each of said conductive means comprising a conductive screen having a number of openings therein sized for allowing a conductive liquid to pass therethrough; a protective housing with a compartment therein secured to said undergarment, said housing including an electrical fitting; a conductive lead connected between each of said conductive means and said fitting; an alarm system including a remote receiver, and a transmitter means in said compartment including, a power source, a transmitter for producing a radio signal to activate said receiver when connected to said power source, and a signal control means connected to said power source and releasably connected to said fitting for connecting said power source to said transmitter when activated by said conductive means when a conductive liquid bridges the space between said conductive means.

3. An undergarment for detecting the presence of a conductive liquid therein, said undergarment of the type covering the lower trunk of a human body with a crotch portion comprising; an open-top protective housing with a compartment therein, secured to said undergarment, said housing including a lid attached to one side of the opening and extending over the opening; a pair of conductive means secured to the crotch portion of said undergarment in spaced-apart relation with a liquid-permeable insulator therebetween; means detachably carried in said compartment of the housing, said means including, a power source, a transmitter for producing an audible sound when connected to said power source, and a control means connected to said power source and detachably connected to said conductive means for connecting said power source to said transmitter when a liquid electrically bridges the space between the said conductive means.

References Cited

UNITED STATES PATENTS 2,687,721    8/1954    Ellison _____ 340—235 XR

FOREIGN PATENTS 549,869    7/1956    Belgium.

DONALD J. YUSKO, Primary Examiner